(12) United States Patent
Ho

(10) Patent No.: US 6,726,112 B1
(45) Date of Patent: Apr. 27, 2004

(54) ILLUMINATING THERMOSTAT

(76) Inventor: Joseph Ho, 2341 Glenstone Ave., Hacienda Heights, CA (US) 91745

( * ) Notice: Subject to any disclaimer, the term of this patent is extended or adjusted under 35 U.S.C. 154(b) by 0 days.

(21) Appl. No.: 10/383,394

(22) Filed: Mar. 7, 2003

(51) Int. Cl.[7] .............................................. G05D 23/00
(52) U.S. Cl. .................................... 236/94; 62/130
(58) Field of Search ........................... 236/94; 62/125, 62/126, 127, 129, 130; 165/11.1

(56) References Cited

U.S. PATENT DOCUMENTS

| 4,271,897 | A | * | 6/1981 | Tatemoto ................... 165/11.1 |
| 6,155,341 | A | * | 12/2000 | Thompson et al. ......... 165/244 |
| 6,206,295 | B1 | * | 3/2001 | LaCoste ....................... 236/94 |

* cited by examiner

Primary Examiner—Harry B. Tanner
(74) Attorney, Agent, or Firm—Philip K. Yu; East IP Group Birch Stewart LLP

(57) ABSTRACT

A thermostat for a HVAC system with visual display of status and operating condition. The thermostat has a power switch to select one of Heater and Cooler for the HVAC system, a light sensor (200) to sense ambient lighting, a temperature sensor (210) to sense ambient temperature, a manual temperature switch (260) to set a desired temperature for the room, a control circuit (220) to select a preferred temperature based on selection of the power switch, an illuminating outer cover (110), which at least partially covers the outside of the thermostat, which displays one of Blue and Red colors according to selection of the power switch and the ambient lighting, and a plurality of LED displays (140) arranged on a display face of the thermostat, to display one arrangement of the LEDs based on a difference between the preferred temperature and the ambient lighting.

17 Claims, 2 Drawing Sheets

ILLUMINATING THERMOSTAT

FIELD OF THE INVENTION

The present invention is related to thermostat controls commonly used in connection with residential or office heating ventilation air-condition systems ("HVAC"), and more particularly related to thermostat controls that provide easy and convenient reading of its operating status.

ART BACKGROUND

Ever since the days of the national energy and gasoline crisis in the 1970s, the general public has been reminded over and over again that they should conserve energy whenever possible. Such reminder became especially significant, during the time when California went through its state-wide electric energy crisis. What can the general public do? Aside from driving less, using carpool or turning off appliances when not in use, one area where the consumers can help is right in their homes. For residential usage, energy policymakers in our government have advocated that the HVAC be turned off when no one is at home. Additionally, HVAC should be set differently between summer and winter seasons. In summer, the ideal temperature setting should be 78° F., while the ideal temperature setting in winter should be 68° F. This seasonal change will help conserve energy for home or commercial settings, without sacrificing their comfort.

While most people fully appreciate the need to conserve energy and are willing to cooperate in such endeavor, achieving such goal is not always possible, largely due to human error or negligence. For example, energy is wasted when the consumer forgets to turn the HVAC off when there is no one in the house. Energy is also wasted when the consumer neglects to adjust the setting during night time, or between seasons.

To make up for human imperfection, the HVAC industry has long promoted programmable thermostats. Such programmable thermostats use a timer to partition each day, during the week and in weekend, into different time zones, each of which can have a different temperature setting to regulate the HVAC's operation according to the users' routine during the week and weekend. For example, in winter, from 6 pm through 11 pm, the time zone can be set to provide a comfortable setting around 68° F., since people are at home during that time. From 11 pm through 7 am, the time zone can be set to provide an even lower setting, since there is much less activity during night time. During the week's day time, the setting may be to turn the HVAC off, since there is generally no one at home. For weekend, the HVAC may be turned back on, since there will be people at home. The programmable controls will adjust the settings of the HVAC, after being setup by the consumer initially. From that point on, the consumer does not have to concern himself with adjusting the temperature setting, whether it is for the day time setting, the night time setting, or even for the seasonal change.

Not everyone embraces a programmable thermostat, much in the same way that not everyone finds a programmable VCR useful, or easy to use. Aside from commanding a higher price than its conventional counterparts, the programmable thermostats are deemed by many to be either unnecessary, an overkill, or simply too complicated to use. From the perspective of those skeptics or nonbelievers, they can, and are willing to, adjust the thermostat manually, on the fly. For those who find the programmable thermostat too complicated, they simply ignore the convenience offered by the programmability, and instead resort to the "manual" ON/OFF switch of the programmable thermostat. Such tendency defeats the purpose of having a programmable thermostat, as well as causes inefficient and wasteful use of heating and cooling energy in the homes.

For the manual thermostats, or those programmable thermostats operated in manual mode, one of the major drawbacks has been that they do not provide a useful reminder to the users of their status. Limited by the physical size, and the need to be inconspicuous, the conventional thermostats require the users to come close in order to observe the read-out. Due to this extra effort required, the users end up not being reminded to check the status, or to adjust for different time periods. Some of the read-out displays on the thermostat have become so small that they even motivated certain inventors to invent a magnifying glass apparatus, which can be attachable to the thermostats so that the status can be read out. See U.S. Pat. No. Des. 288,670, issued to Steiner, for A COMBINED THERMOSTAT AND MAGNIFIER THEREFOR, and U.S. Pat. No. 4,895,455, issued to Homing, for A COVER FOR WALL MOUNTED THERMOSTAT INCLUDING ILLUMINATION MEANS AND MAGNIFYING MEANS.

Therefore, it would be desirable to have a thermostat that can provide useful status information, in addition to current temperature and pre-set temperature, to the users in a convenient manner.

It would also be desirable to have a thermostat that can facilitate the efficient use of heating and cooling energy.

It would further be desirable to have a thermostat that can alert the users that the setting has been tempered with.

SUMMARY OF THE PRESENT INVENTION

An illuminating thermostat for a HVAC system with visual display is disclosed. The thermostat has a power switch to select one of heater and cooler for the HVAC system, a light sensor (200) to sense ambient lighting, a temperature sensor (210) to sense ambient temperature, a manual temperature switch (260) to control the operation of the heater and cooler, a control circuit (220) to select a preferred built-in temperature based on selection of the power switch, an illuminating outer cover (110) to at least partially cover the thermostat, and to illuminate either one of its colors according to selection of the power switch and the ambient lighting, and a plurality of LED displays (140) arranged on a display face of the thermostat, which display one arrangement of the LEDs based on a difference between the preferred temperature and the ambient temperature.

The user of the thermostat can readily determine whether the HVAC is turned on by looking at the illuminating cover, which displays one color, e.g. Blue, if the cooler is selected or another color, e.g. Red, if the heater is selected, without having to approach the thermostat or turn on the ambient light. The strength of the Blue or Red color on the illuminating cover may also be positively proportional to the ambient lighting, such that the color remains visible in both bright and dark ambient lighting situation. The user can also readily determine whether the HVAC is operating consistent with the preferred and optimal temperature setting by visually observing the location at which one, or more, of the LEDs is lit up. In one situation, the location of the LED that is lit up will indicate whether the actual temperature is above or below the preferred temperature and extent of such difference. The warmer it gets above the preferred temperature, the farther the LED to the right of the optimal state LED is lit. In the opposition situation, the cooler it is below the preferred temperature, the farther the LED to the left of the optimal state LED is lit.

The illuminating thermostat in accordance with the present invention allows the user to conveniently obtain status, usage and ambience information much more effortlessly than the conventional thermostat.

DETAILED DESCRIPTION OF THE PREFERRED EMBODIMENT

A thermostat with illuminating visual display is disclosed. The thermostat in accordance with the present invention provides visual information to its users about the operating status with respect to the setting.

Figure 1:
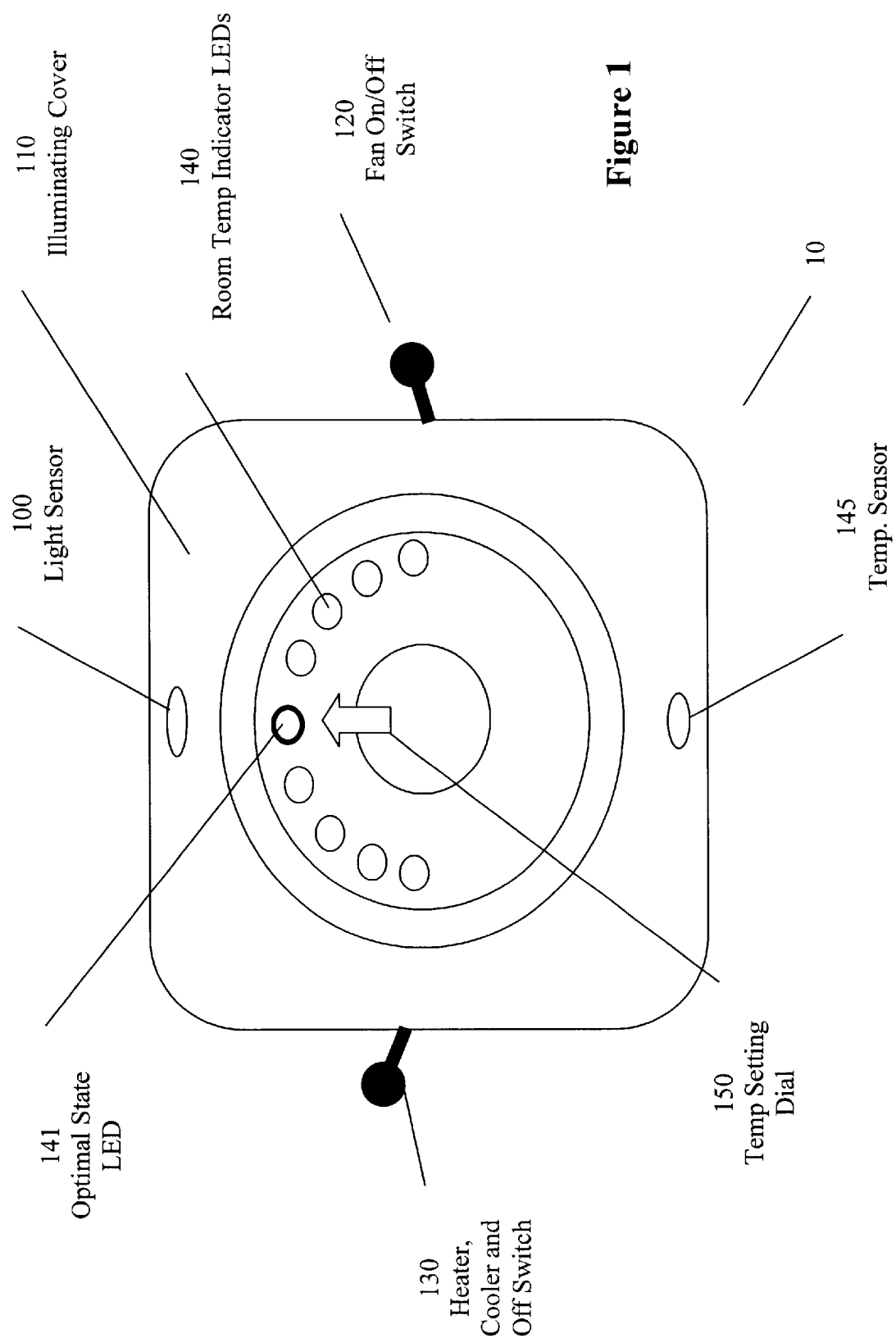
FIG. 1 is a simplified diagram illustrating an exemplary embodiment of a thermostat in accordance with the present invention.

One aspect of the thermostat in accordance with the present invention has a light sensor and an illuminating cover, which together form a visual status display for the users. An exemplary embodiment is shown in FIG. 1. The light sensor 100 of the thermostat 10 detects the brightness in the ambience and in turn causes the illuminating cover 110 to brighten or dim its display intensity. The illuminating display 110 illuminates one of its multiple colors, e.g. either a Blue or Red color, depending on whether the power switch 130 is set to COOLER or HEATER, respectively. If the power switch 130 is OFF, then no illumination is generated from the illuminating cover 110. If the room is well lit, e.g. during day time, then the light sensor 100 senses it and causes the illuminating cover 110 to intensify its illumination, whether the color is Blue or Red, so that the operating status of the thermostat 10 remains plainly visible, even from a distance. If the room is dark or not lit, as in the evening or night time, the light sensor 100 senses it and causes the illuminating cover 110 to dim its illumination, so that its operating status remains still plainly visible, even in the dark and from a distance. In other words, the intensity of the color displayed by the illuminating cover 110 is caused to be positively proportional to the ambient lighting, in order to achieve visibility at all times. This variable illumination allows the cover 110 to provide a visual display of whether the thermostat 10 is operating as a Heater or Cooler, or even operating at all. Especially from a distance, the thermostat's illuminating cover 110 provides a vivid reminder to the users as to the status of the thermostat.

The illuminating cover 110 may be implemented with a group of blue LEDs and a group of red LEDs, underneath or within the illuminating cover. The number of either blue or red LEDs to be lit up is proportional to the ambient lighting that is detected by the light sensor 100. If the room is bright, then more LEDs of either blue or red color will be lit up to create an even brighter illumination than the ambience. If the room is dark, the fewer LEDs of either blue or red color will be lit up. The selection of either blue or red LEDs, as previously mentioned, is based on whether it is the cooler or heater that is selected by the user. Alternatively, bi-color or multi-color LEDs are also available where one LED can display either one of the built-in colors when current is applied to the specific terminals of the LED.

Another aspect of the illuminating thermostat 10 in accordance with the present invention has a room temperature indicator 140, which displays the difference between the ambient temperature and the preferred built-in setting of the season. As previously mentioned, the preferred temperature setting for winter season is 68° F., and the preferred temperature setting for summer season is 78° F. Such preferred temperature settings are built-in in the electronic control circuitry of the illuminating thermostat 10 and it is constantly compared with the room temperature sensed by the temperature sensor 145.

If the room temperature is higher than the preferred temperature setting, the room temperature indicator 140 to the right of the optimal state LED 141 will light up. The higher the temperature relative to the preferred temperature setting, the indicator further to the right of the optimal state LED 141 will light up. If the room temperature is lower than the preferred temperature setting, the indicator to the left of the optimal state LED 141 will light up. The lower the temperature relative to the preferred setting, the indicator further to the left will light up. As such, the room temperature indicator 140 provides another visual display of whether the HVAC associated with thermostat 10 is operating at or near its optimal state, as dictated by the built-in preferred temperature setting. The preferred temperature, whether it is 68° F. or 78° F., is dictated by whether the switch 130 is flipped to Heater or to Cooler. When the switch 130 is switched to Heater, it indicates it is winter time, and the preferred temperature should be set to 68° F. When the switch 130 is switched to Cooler, it indicates it is summer time, and the preferred temperature should be set to 78° F.

Preferably, the room temperature indicator 140 shows a gradation, or a spectrum, of shades from Red to Blue, reflective of "Too Warm" to "Too Cool". For example, the indicator 140 may comprise of 15 light-emitted diodes, placed in a semicircular arrangement. To show different shades of blue and red, the LEDs are covered by a color plate with different shades of blue and red, from coolest to warmest, at the corresponding positions. At the far left, a dark blue can indicate "Too Cool", whereas at the far right, a dark red can indicate "Too Warm". The middle, maybe in a white or neutral color, can indicate "OPTIMAL STATE." By looking at the LEDs 140, the user can determine whether the thermostat 10 is operating optimally, too warm or too cold, all without having to get close to the thermostat for a readout.

Therefore, the power switch 130 will dictate which one of the preferred temperatures will be the threshold, i.e. 68° F. for winter and 78° F. for summer. The temperature sensor 145 will compare the actual room temperature with the preferred temperature and translate the result to the room temperature indicator 140. As such, the user can visually acquire graphical information of whether the thermostat is operating optimally according to the preferred temperature of the season. If the room temperature indicator 140 has one of its LEDs lit up at the far right, i.e. Dark Red, it means the room is too warm for the preferred temperature. If it is in winter, then the user may wish to turn down the heater, since it is too warm, thus not energy efficient. If it is in summer, then the user may wish to crank up the cooler, since it is not cool enough, thus not comfortable.

Figure 2:
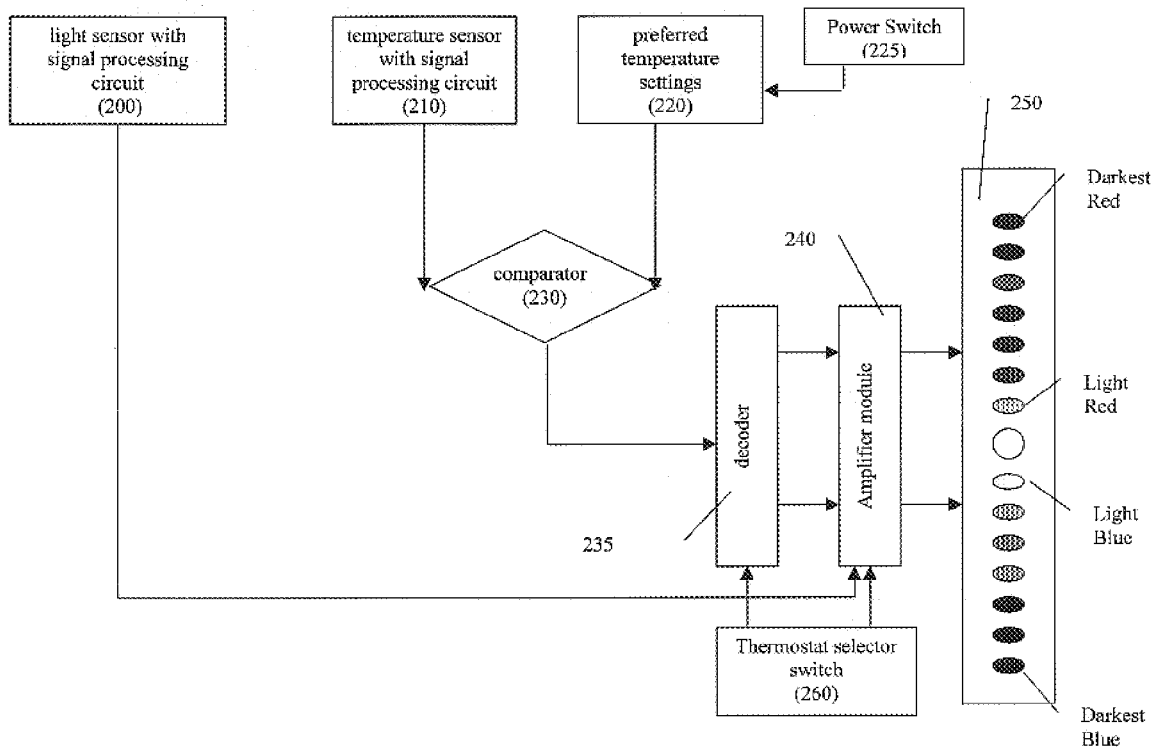
FIG. 2 is a simplified functional diagram illustrating an exemplary embodiment of the thermostat.

FIG. 2 illustrates a simplified functional block diagram of an exemplary thermostat in accordance with the present invention. The light sensor 200 senses the ambient lighting. The temperature sensor 210 senses the ambient temperature, which is compared with the preferred temperature setting 220, using a comparator circuit 230. The result of the comparator is decoded by a decoder 235 and applied to an amplifier 240. Both the decoder 235 and the amplifier 240 are operated based on the thermostat selector 260 (Cooler, Heater or Off). The amplifier 240 then causes the LED spectrum lights 250 to light up according to how the room temperature is relative to the preferred temperature. For example, if dark red is lit up by one LED at one far end of the spectrum, it indicates an extremely warm state. At the other far end of the spectrum, dark blue is lit to indicate an extremely cold state. The LEDs in-between will show different gradations of blue and red, hence different temperature differentials relative to the optimal state. Therefore, at any time, only one LED needs to be lit up, since the location of the blue or red LED will indicate the ambient temperature relative to the preferred setting. Alternatively, the spectrum may light up gradually more LEDs, as the temperature gets warmer. It can begin with just a single blue LED at the far left end, where it is the coolest. When all the LEDs are lit, it means the ambient temperature is the warmest.

The illuminating thermostat in accordance with the present invention can be advantageously used in the following exemplary ways:

a) When the user is about to leave the house, the Blue or Red color displayed by the illuminating cover will remind the user that the HVAC system is still on. The user should turn it off before departure, to conserve energy. The display of Blue or Red is also enhanced or dimmed based on the in-room lighting so that the illuminating cover will remain visible in any ambient lighting.

b) In summer time, the illuminating cover should display Blue color to reflect that the cooler of the HVAC is turned on. Now, if the cover shows Red, then that means that someone, e.g. a child, may have tempered with the setting or the switch.

c) In winter time, the preferred setting is automatically 68° F. as dictated by the built-in circuitry. This is both energy efficient and still within the comfort zone. When the room temperature reaches this setting, the room temperature display 140 will light up the optimal location, i.e. the white LED 141, after a while. However, if the room temperature display 140 shows either Blue or Red, after a while, it serves to remind the user that the manual setting has been tempered with.

d) In winter time, the user may manually set the temperature to be higher than the preferred built-in setting of 68° F. As such, the actual room temperature reached will be compared with the preferred setting of 68° F. If the actual room temperature is higher than the preferred setting, it will cause the room temperature display 140 to display in its Red zone. This will serve as a reminder to the user that the thermostat is not operating in an optimal manner, and the user should reconsider lowering its manual setting.

As can be appreciated by those who have used a conventional thermostat for the HVAC, the user must get close to the conventional thermostat in order to read out which switch is activated, the "Current Temperature," and the "Set Temperature." Only upon approaching the thermostat and reading out the finely printed display can the user then judge whether the HVAC is operating in a proper mode, i.e. Heater or Cooler. Otherwise, the user cannot readily judge whether the temperature setting is too high or low, and wasting energy as a result. To reach that determination, it forces the user to approach the thermostat, observe the displayed information and then make a determination as a result. Additionally, if the room is dark or poorly lit, the user may have to turn on the light switch in order to observe the readout. Therefore, the conventional thermostats for HVACs are neither user friendly, nor conducive to conserving energy.

With the illuminating thermostat in accordance with the present invention, the use can easily determine 1) whether the thermostat is switched on or off properly, 2) whether the setting of temperature is appropriate, and 3) whether the HVAC is operating in an energy efficient manner according to the preferred, built-in setting. Such determination can be made by the user without having to turn on the ambient lighting, approaching the thermostat, and trying to read the finely printed display of the room temperature, and set temperature.

An exemplary embodiment of the present invention can be realized using the following components:

a. An illuminating cover that can display Blue or Red (implemented by one or more bi-color LEDs underneath the cover) in response to the power switch, which selects Cooler, Heater, or OFF;

b. A power switch that can be operated to select Cooler, Heater, or OFF;

c. A fan switch that can be operated to select to Fan-On or Fan-Auto;

d. A light sensor that senses the ambient lighting and generates a control signal accordingly;

e. An amplifier that controls the intensity of Blue or Red color displayed by the illuminating cover, by controlling the bi-color LEDs to be lit up, based on the control signal from the light sensor;

f. A manual temperature setting that allows the user to set a desired room temperature for the Heater or Cooler to operate;

g. A temperature sensor that senses the actual room temperature;

h. A built-in preferred temperature setting that selects one of the preferred temperatures based on the selection of the Heater or Cooler switch;

i. A spectrum of LEDs that are lit up based on the difference between the sensed actual room temperature and the preferred temperature.

What is claimed is:

1. A thermostat for a HVAC system, comprising:

a power switch (225), disposed to selectively operate one of Heater and Cooler for said HVAC system;

a light sensor (200), disposed to sense ambient lighting;

a temperature sensor (210), disposed to sense ambient temperature;

a manual temperature switch (260), disposed to control operation of said one of Heater and Cooler of said HVAC system;

a control circuit (220), adapted to select one preferred temperature based on selection of said power switch;

an illuminating outer cover (110), disposed to cover at least partially an exterior of said thermostat, said illuminating outer cover disposed to illuminate one of a plurality of colors based on selection of said power switch;

a plurality of LED displays (140) arranged on a display face of said thermostat, disposed to display one arrangement of the LEDs based on a difference between said preferred temperature and said ambient temperature.

2. A thermostat of claim 1, wherein said one arrangement of the LEDs comprises displaying at least one of the LEDs corresponding to the difference between the preferred temperature and the room temperature.

3. A thermostat of claim 1, wherein said control circuit further comprises a compare circuit adapted to compare said ambient temperature with said preferred temperature.

4. A thermostat of claim 3, wherein said illuminating outer cover further comprises an amplifier adapted to amplify or dim said cover based on said ambient lighting as sensed by said light sensor, such that said illuminating outer cover remains visible in any ambient lighting.

5. The thermostat of claim 4, wherein amplifier is adapted to selectively turn on:
   at least one of a plurality of blue LEDs, based on said light sensor and said power switch;
   at least one of a plurality of red LEDs, on based on said light sensor and said power switch.

6. The thermostat of claim 4, wherein amplifier is adapted to selectively turn on:
   at least one bi-color LED within said illuminating cover, disposed to selectively turn on one of its colors, corresponding to said light sensor and said power switch.

7. The thermostat of claim 1, wherein said illuminating cover further comprises:
   a plurality of blue LEDs, at least one of which is selectively turned on, corresponding to said light sensor and said power switch;
   a plurality of red LEDs, at least one of which is selectively turned on corresponding to said light sensor and said power switch.

8. The thermostat of claim 1, wherein said illuminating cover further comprises:
   at least one bi-color LED within said illuminating cover, disposed to selectively turn on one of its colors, corresponding to said light sensor and said power switch.

9. A thermostat for a HVAC system, comprising:
   a mode selector, disposed to select one of Heater and Cooler mode of said HVAC;
   a light sensor, disposed to sense ambient lighting;
   a temperature sensor, disposed to sense ambient temperature;
   an automatic temperature control, disposed to select one of two preferred temperatures based on said mode selector;
   an illuminating cover, disposed to partially cover said thermostat, and to provide one of a plurality of colors;
   a first amplifier, disposed to control said illuminating cover's intensity based on said mode selector, wherein red is displayed when Heater mode is selected and blue is displayed when Cooler mode is selected;
   a variable LED display, disposed to display an arrangement of said LED display;
   a second amplifier, disposed to control said variable LED display based on a difference between said ambient temperature and said preferred temperature.

10. The thermostat of claim 9, wherein said second amplifier causes said variable LED display to display red when the ambient temperature is higher than the preferred temperature, and to display blue when the ambient temperature is lower than the preferred temperature.

11. The thermostat of claim 10, wherein said first amplifier varies the intensity based on the ambient lighting detected by the light sensor, such that the cover remains visible in the ambient lighting.

12. The thermostat of claim 11, where said illuminating cover further comprises a plurality of blue and red LEDs underneath, said blue LEDs being selectively turned on based on the ambient lighting in said Cooler mode, said red LEDs being selectively turned on based on the ambient lighting in said Heater mode.

13. The thermostat of claim 11, where said illuminating cover further comprises at least one bi-color LED within said illuminating cover for selectively turning on one of its colors, a first color being turned on based on the ambient lighting in said Cooler mode, a second color being turned on based on the ambient lighting in said Heater mode.

14. A thermostat for a HVAC system, said HVAC having a heater element, a cooler element and a fan element, comprising:
   a housing, disposed to house said thermostat, said housing having a generally square-shaped bottom plate, a generally square-shaped top plate and four sidewalls between the top and bottom plates;
   a power switch, protruding from one of the sidewalls, for controlling operation of said HVAC;
   a fan switch, protruding from another one of the sidewalls, for controlling operation of said fan element of said HVAC;
   wherein said top plate of said housing further comprises:
      an illuminating cover on the outside of said top plate, disposed to display one of a plurality of colors in response to the selection of one of said heater element and said cooler element,
   said thermostat further comprising:
      a plurality of LED displays;
      a temperature sensor, disposed to detect room temperature;
      a light sensor, disposed to detect room illumination;
      a manual temperature control, disposed to set a temperature desired for said HVAC;
      a control circuit, disposed to select a preferred temperature based on selection of said heater and cooler elements;
      a compare circuit, disposed to compare said room temperature with said preferred temperature and generate a control signal, reflective of a difference between said room temperature and said preferred temperature;
      a decoder circuit, disposed to decode said control signal;
      an amplifier circuit, disposed to turn on a predetermined arrangement of said LED displays to represent said difference.

15. The thermostat of claim 14, wherein said amplifier circuit turns on a predetermined one of said LED displays corresponding to the magnitude of said difference.

16. The thermostat of claim 15, further comprising a color plate covering said LED displays, said color plate having a plurality of colors of different shades of blue and red to filter said LED displays.

17. The thermostat of claim 14, wherein said plurality of LED displays is arranged in a spectrum of LED lights, at least one of which is turned on corresponding to magnitude of said difference.

* * * * *